United States Patent
He et al.

(10) Patent No.: US 11,621,513 B2
(45) Date of Patent: Apr. 4, 2023

(54) VEHICLE USB TYPE-C CONNECTOR

(71) Applicant: AMPHENOL EAST ASIA ELECTRONIC TECHNOLOGY (SHEN ZHEN) CO., LTD., Shen Zhen (CN)

(72) Inventors: Dan-Ren He, Shen Zhen (CN); Miao-Hui Gong, Shen Zhen (CN)

(73) Assignee: Amphenol East Asia Electronic Technology (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 17/337,047

(22) Filed: Jun. 2, 2021

(65) Prior Publication Data

US 2022/0393384 A1 Dec. 8, 2022

(51) Int. Cl.

| | |
|---|---|
| *H01R 13/453* | (2006.01) |
| *G06F 13/38* | (2006.01) |
| *H01R 13/642* | (2006.01) |
| *H01R 13/504* | (2006.01) |
| *H01R 12/70* | (2011.01) |

(52) U.S. Cl.
CPC ....... *H01R 13/4538* (2013.01); *G06F 13/385* (2013.01); *H01R 12/7064* (2013.01); *H01R 13/504* (2013.01); *H01R 13/642* (2013.01); *G06F 2213/0042* (2013.01); *H01R 2201/26* (2013.01)

(58) Field of Classification Search
None
See application file for complete search history.

(56) References Cited

U.S. PATENT DOCUMENTS

| 9,484,679 B2 | 11/2016 | Guo et al. |
| 9,509,084 B2 | 11/2016 | Zhao et al. |

(Continued)

FOREIGN PATENT DOCUMENTS

| CN | 101019277 A | 8/2007 |
| CN | 102047507 A | 5/2011 |

(Continued)

OTHER PUBLICATIONS

Chinese Office Action dated Oct. 8, 2018 in connection with Chinese Application No. 201580081064.1.

(Continued)

*Primary Examiner* — Oscar C Jimenez
(74) *Attorney, Agent, or Firm* — Wolf, Greenfield & Sacks, P.C.

(57) ABSTRACT

A vehicle USB Type-C connector, comprising a cable end member and a board end member engaged together; the CPA is inserted into the engagement groove; the PCB attached male head has an end protruding from a cavity opening on one end of the cable end plastic shell cavity; the encapsulated outer mold is inserted into a cavity opening on another end of the cable end plastic shell cavity; the encapsulated outer mold has an engagement side on two sides thereof and inserted into the lateral engagement groove; the upper lock plate is engaged above the engagement groove, the lower lock plate is inserted into the engagement groove, and the CPA is fastened with the cable end member. The present invention reduces the on-board height and strengthens the liability after engagement.

20 Claims, 3 Drawing Sheets

(56) References Cited

U.S. PATENT DOCUMENTS

| | | | |
|---|---|---|---|
| 9,553,410 B2 | 1/2017 | Zhao et al. |
| 9,685,728 B2 | 6/2017 | Yao et al. |
| 9,711,910 B2 | 7/2017 | Zhao et al. |
| 9,742,098 B2 | 8/2017 | Zhao et al. |
| 9,755,348 B2 | 9/2017 | Guo et al. |
| 9,768,544 B2 | 9/2017 | Du et al. |
| 9,774,130 B2 | 9/2017 | Zhao et al. |
| 9,806,475 B2 | 10/2017 | Yao et al. |
| 9,853,393 B2 | 12/2017 | Guo et al. |
| 9,871,317 B2 | 1/2018 | Zhang et al. |
| 9,871,318 B2 | 1/2018 | Wang |
| 9,893,459 B2 | 2/2018 | Zhao et al. |
| 9,954,303 B2 | 4/2018 | Guo et al. |
| 9,997,859 B2 | 6/2018 | Yu |
| 9,997,865 B2 | 6/2018 | Yao |
| 9,997,866 B1 | 6/2018 | Hsu |
| 10,044,148 B2 | 8/2018 | Zhao |
| 10,050,373 B2 | 8/2018 | Wang |
| 10,062,999 B2 | 8/2018 | Yao et al. |
| 10,096,932 B2 | 10/2018 | Chang et al. |
| 10,096,947 B2 | 10/2018 | Cheng et al. |
| 10,109,948 B2 | 10/2018 | Zhao et al. |
| 10,177,488 B2 | 1/2019 | Zhao |
| 10,193,271 B2 | 1/2019 | Yu et al. |
| 10,199,763 B2 | 2/2019 | Zhu et al. |
| 10,199,764 B2 | 2/2019 | Wang |
| 10,903,610 B1 * | 1/2021 | He | H01R 13/514 |
| 10,910,747 B1 * | 2/2021 | He | H01R 12/75 |
| 2010/0330849 A1 | 12/2010 | Wang et al. |
| 2011/0151716 A1 | 6/2011 | Kondo |
| 2015/0229075 A1 * | 8/2015 | Lin | H01R 13/6582 |
| | | | 439/153 |
| 2016/0064879 A1 | 3/2016 | Yen et al. |
| 2017/0207570 A1 | 7/2017 | Guo et al. |
| 2017/0288333 A1 | 10/2017 | Yao et al. |
| 2017/0288360 A1 | 10/2017 | Zhao et al. |
| 2017/0302031 A1 | 10/2017 | Cheng et al. |
| 2017/0302037 A1 | 10/2017 | Yao et al. |
| 2017/0324187 A1 | 11/2017 | Zhu et al. |
| 2017/0338584 A1 | 11/2017 | Yao |
| 2017/0338585 A1 | 11/2017 | Wang |
| 2017/0338586 A1 | 11/2017 | Wang |
| 2017/0365961 A1 | 12/2017 | Zhao |
| 2018/0019534 A1 | 1/2018 | Yu |
| 2018/0034195 A1 | 2/2018 | Chang et al. |
| 2018/0151983 A1 | 5/2018 | Zhao |
| 2018/0151987 A1 | 5/2018 | Zhao |
| 2018/0151988 A1 | 5/2018 | Zhao |
| 2018/0159267 A1 | 6/2018 | Zhao |
| 2018/0175562 A1 | 6/2018 | Zhao |
| 2018/0323548 A1 | 11/2018 | Zhao |
| 2018/0337489 A1 | 11/2018 | Zhao |
| 2018/0342839 A1 | 11/2018 | Zhao et al. |
| 2018/0351287 A1 | 12/2018 | Zhao |
| 2018/0358756 A1 | 12/2018 | Zhao |
| 2018/0375263 A1 | 12/2018 | Zhong et al. |

FOREIGN PATENT DOCUMENTS

| | | |
|---|---|---|
| CN | 204243365 U | 4/2015 |
| JP | 3196314 U | 3/2015 |
| TW | M493185 U | 1/2015 |
| WO | WO 2009/147791 | 12/2009 |

OTHER PUBLICATIONS

Chinese Office Action dated Jul. 4, 2019 in connection with Chinese Application No. 201580081064.1.

International Search Report and Written Opinion dated Mar. 22, 2016 in connection with International Application No. PCT/SG2015/050478.

International Preliminary Report on Patentability dated Nov. 9, 2017 in connection with International Application No. PCT/SG2015/050478.

[No. Author Listed], Universal Serial Bus Type-C Connectors and Cable Assemblies Compliance Document. Revision 2.1b. Jun. 2021. 86 pages.

Li, Type C Female Side Connector, USAN U.S. Appl. No. 17/308,489, filed May 5, 2021.

* cited by examiner

VEHICLE USB TYPE-C CONNECTOR

BACKGROUND OF THE INVENTION

1. Field of the Invention

The present invention relates to Type-C connectors, and more particularly, to a vehicle USB Type-C connector.

2. Description of the Related Art

With continuously growing data storage amount, the requirement on the transmission rate becomes higher, which represents, in the field of server storage, the increase of clock frequent and the rapid decrease of the rising time. Such change causes higher demand on the transmission rate of the connector. Therefore, various cable interfaces on vehicles exist and cannot be universally applied. Such interfaces have lesser data transmission channels, larger volumes, and heavier weights. Also, the transmission performance is subject to greater limitation, failing to fulfill the newer and higher demands of new generations of Type-C connectors on vehicle USB.

SUMMARY OF THE INVENTION

To improve the issues above, the present invention discloses a vehicle USB Type-C connector having a design of various weld legs, sink plate type, and CPA (connector position assurance) structure.

For achieving the aforementioned objectives, a vehicle USB Type-C connector is provided, comprising a cable end member and a board end member; the cable end member is engaged with the board end member; the cable end member comprises a cable end plastic shell, a CPA, a PCB attached male head, a cover shell, an encapsulated outer mold, and a cable; wherein the cable end plastic shell comprises a cable end plastic shell cavity passing therethrough; the cover shell is inserted into the cable end plastic shell cavity; the cable end plastic shell has an engagement groove on a top portion thereof; the cable end plastic shell has a lateral engagement groove disposed on two sides thereof, respectively; the CPA is inserted into the engagement groove; the PCB attached male head is disposed in the cover shell; the cable has one end passing through the encapsulated outer mold and disposed in the cover shell and connected with one end of the PCB attached male head; the PCB attached male head has another end disposed out of an end of the cover shell and protruding from a cavity opening on one end of the cable end plastic shell cavity; the encapsulated outer mold is disposed on another end of the cover shell and inserted into a cavity opening on another end of the cable end plastic shell cavity; the encapsulated outer mold has an engagement side on two sides thereof, respectively; the engagement side is inserted into the corresponding lateral engagement groove; the board end member comprises a board end plastic shell and a female seat member; the board end plastic shell comprises a board end plastic shell cavity therein; the female seat member is inserted into the board end plastic shell cavity; the board end plastic shell comprises a bevel protrusion on a top portion thereof; the CPA comprises a push plate, an upper lock plate, a lower lock plate, and a U groove; the upper lock plate and the lower lock plate are connected with the push plate; the upper lock plate is arranged above the lower lock plate and shorter than the lower lock plate; the U groove is formed between the upper lock plate and the lower lock plate; the upper lock plate comprises an engagement hook on one end; the lower lock plate comprises a barb; the lower lock plate comprises a bevel hook on one end; the push plate has a resist portion on a bottom portion thereof; the resist portion is applied as a force bearing point during pushing and pressing the push member; the engagement groove comprises an engagement plate on a top portion thereof; the engagement groove comprises a protrusion plate, a bevel groove, and a slope plate therein; when the push plate is pressed and the CPA is inserted into the engagement groove, the upper lock plate is engaged above the engagement groove, the lower lock plate is inserted into the engagement groove, the resist portion resists against the protrusion plate, the engagement plate is engaged into the U groove, the engagement hook hooks one side of the engagement plate, the bevel hook hooks the slope plate, the bevel protrusion is engaged in the bevel groove, the CPA is fastened with the cable end member, and the cable end member is fastened with the board end member.

Preferably, when the push plate is pressed, the resist portion slides to leave the protrusion plate, the bevel hook rises to leave the slope plate to be engaged into the bevel groove, the engagement hook rises to leave the side of the engagement plate, the barb hooks one side of the engagement plate, the CPA is prevented from sliding outward, the CPA is released from the cable end member, and the cable end member is released from the board end member.

Preferably, the female seat member comprises a top hook and an elastic plate on a top portion thereof; the board end plastic shell cavity comprises a top hook groove matching the top hook and an elastic plate engagement groove matching the elastic plate; the top hook hooks the top hook groove; the elastic plate is engaged into the elastic plate engagement groove.

Preferably, the female seat member comprises a weld leg; the weld leg comprises at least two types of weld legs, including dual-row SMT weld legs and SMT&DIP combination weld legs, respectively.

Preferably, the weld legs are performed in a sink plate design.

Preferably, the cover shell comprises an upper cover shell and a lower cover shell; the upper and lower cover shells are stably engaged together.

With such configuration, the present invention achieves following advantages.

Compared with conventional arts, the novel vehicle USB Type-C connector features a wide application capability, multifunctional, small volume and light weight, high integration, and high-performance design. Regarding overall structural functions, one end of the present invention can be connected to a cable end female head, with the other end connected to a cable end male head. The cable end is formed of a plastic-filled encapsulation structure, and the board end weld legs are divided into a dual row SMT and SMT&DIP combination weld legs structures. Those two types of structures are both in a sink plate design manner, thereby reducing the on-board height of the connector. The present invention integrates the CPA design for strengthening the liability after engagement. The cable end connector can optionally apply various kinds of Type-C male head meeting the regulations of USB Type-C connector, and the cable can be manufactured into various cable products such as USB 3.1 Type-C full functions (Gen 1, Gen 2) or PD large power charging structure. Therefore, the present invention fulfills the demands on a new generation of vehicle USB Type-C connectors.

DETAILED DESCRIPTION OF THE INVENTION

Figure 1:
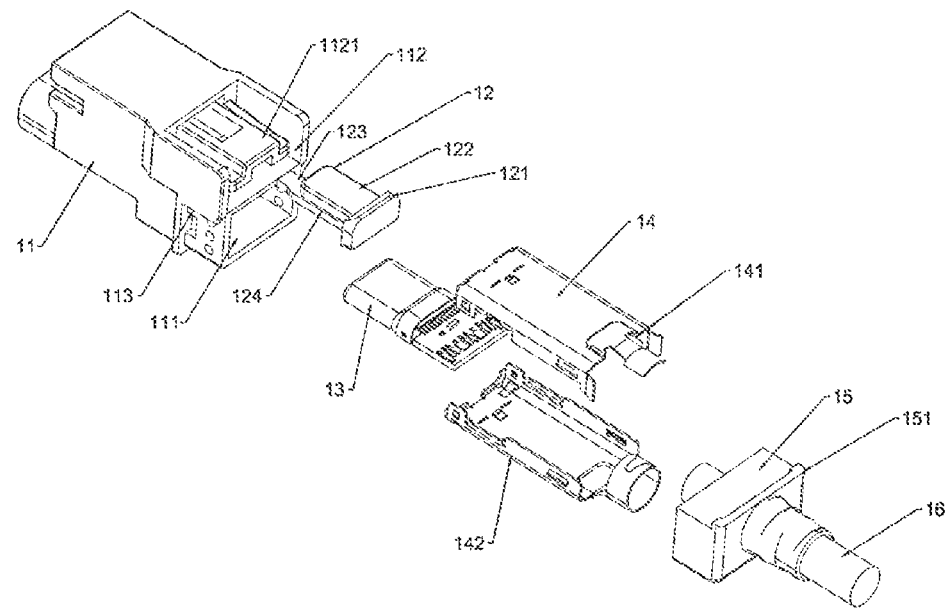
FIG. 1 is an exploded view of a vehicle USB Type-C connector in accordance with an embodiment of the present invention.
Figure 2:
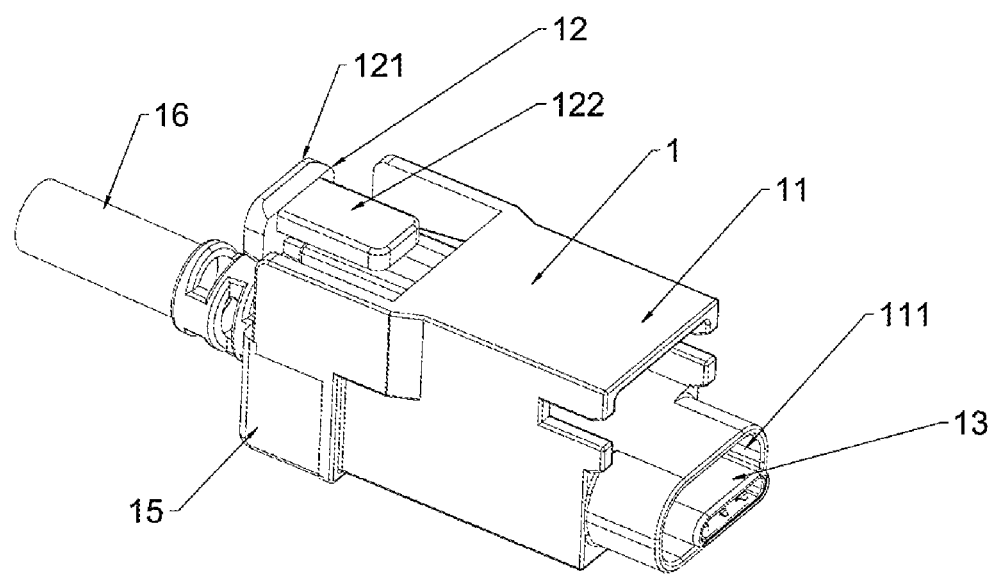
FIG. 2 is a perspective view of a vehicle USB Type-C connector in accordance with an embodiment of the present invention.
Figure 3:
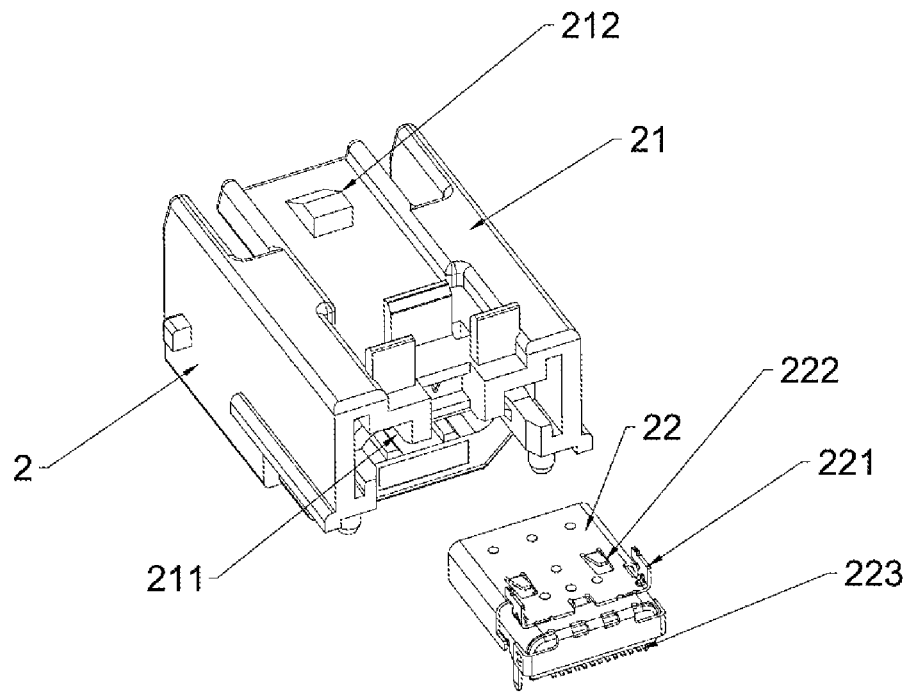
FIG. 3 is an exploded view of a vehicle USB Type-C connector in accordance with an embodiment of the present invention.

The aforementioned and further advantages and features of the present invention will be understood by reference to the description of the preferred embodiment in conjunction with the accompanying drawings where the components are illustrated based on a proportion for explanation but not subject to the actual component proportion.

Referring to FIG. 1 to FIG. 6, the present invention is illustrated in detail. However, such content does not limit the scope of the present invention.

Embodiment 1

Referring to FIG. 1 to FIG. 6, a vehicle USB Type-C connector comprises a cable end member 1 and a board end member 2, wherein the cable end member 1 is engaged with the board end member 2.

The cable end member 1 comprises a cable end plastic shell 11, a CPA (connector position assurance) 12, a PCB attached male head 13, a cover shell 14, an encapsulated outer mold 15, and a cable 16; wherein the cable end plastic shell 11 comprises a cable end plastic shell cavity 111 passing therethrough; the cover shell 14 is inserted into the cable end plastic shell cavity 111; the cable end plastic shell 11 has an engagement groove 112 on a top portion thereof; the cable end plastic shell 11 has a lateral engagement groove 113 disposed on two sides thereof, respectively; the CPA 12 is inserted into the engagement groove 112; the PCB attached male head 13 is disposed in the cover shell 14; the cable 16 has one end passing through the encapsulated outer mold 15 and disposed in the cover shell 14 and connected with one end of the PCB attached male head 13; the PCB attached male head 13 has another end disposed out of an end of the cover shell 14 and protruding from a cavity opening on one end of the cable end plastic shell cavity 111; the encapsulated outer mold 15 is disposed on another end of the cover shell 14 and inserted into a cavity opening on another end of the cable end plastic shell cavity 111; the encapsulated outer mold 15 has an engagement side 151 on two sides thereof, respectively; the engagement side 151 is inserted into the corresponding lateral engagement groove 113.

The board end member 2 comprises a board end plastic shell 21 and a female seat member 22; the board end plastic shell 21 comprises a board end plastic shell cavity 211 therein; the female seat member 22 is inserted into the board end plastic shell cavity 211.

The board end plastic shell 21 comprises a bevel protrusion 212 on a top portion thereof.

The CPA comprises a push plate 121, an upper lock plate 122, a lower lock plate 123, and a U groove 124; the upper lock plate 122 and the lower lock plate 123 are connected with the push plate 121; the upper lock plate 122 is arranged above the lower lock plate 123 and shorter than the lower lock plate 123; the U groove 124 is formed between the upper lock plate 122 and the lower lock plate 123; the upper lock plate 122 comprises an engagement hook 1221 on one end; the lower lock plate 123 comprises a barb 1231; the lower lock plate 123 comprises a bevel hook 1232 on one end; the push plate 121 has a resist portion 1211 on a bottom portion thereof; the resist portion 1211 is applied as a force bearing point during pushing and pressing the push member 121.

The engagement groove 112 comprises an engagement plate 1121 on a top portion thereof; the engagement groove 112 comprises a protrusion plate 1122, a bevel groove 1123, and a slope plate 1124 therein.

The female seat member 22 comprises a top hook 221 and an elastic plate 222 on a top portion thereof; the board end plastic shell cavity 211 comprises a top hook groove matching the top hook 221 and an elastic plate engagement groove matching the elastic plate 222; the top hook 221 hooks the top hook groove; the elastic plate 222 is engaged into the elastic plate engagement groove.

The female seat member 22 comprises a weld leg 223; the weld leg 223 comprises at least two types of weld legs, including dual-row SMT weld legs and SMT&DIP combination weld legs, respectively. The weld legs 223 are performed in a sink plate design.

The cover shell 14 comprises an upper cover shell 141 and a lower cover shell 142; the upper cover shell 141 and lower cover shell 142 are stably engaged together.

Figure 4:
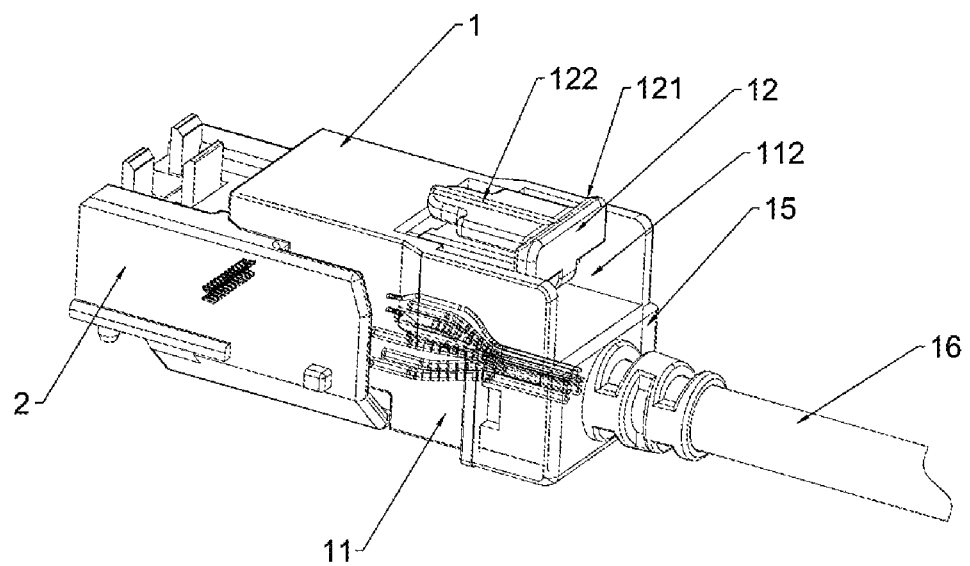
FIG. 4 is schematic view illustrating the structures of a vehicle USB Type-C connector in accordance with an embodiment of the present invention.
Figure 5:
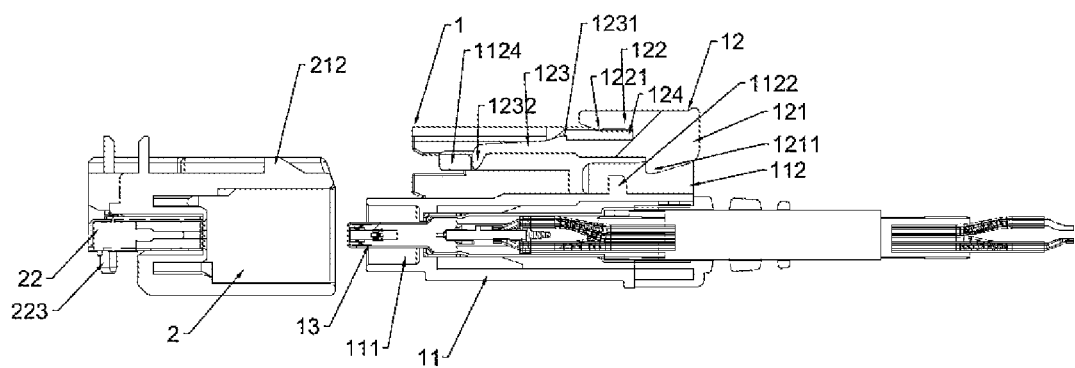
FIG. 5 is a sectional view illustrating the vehicle USB Type-C connector in a fastened status.
Figure 6:
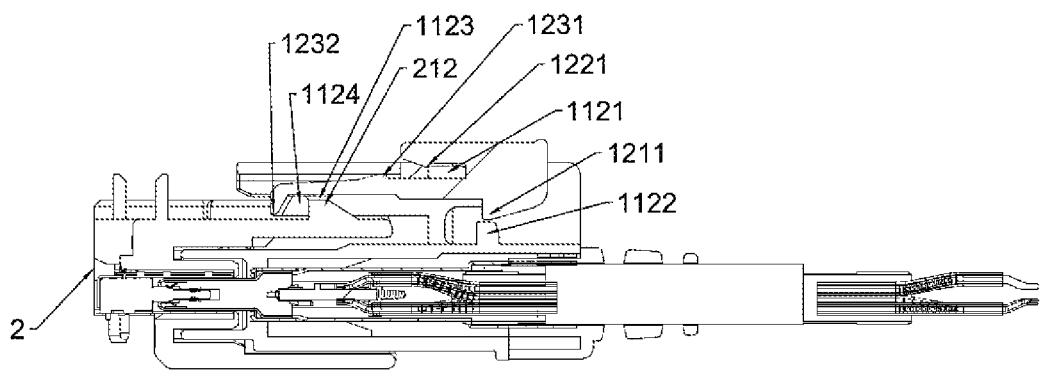
FIG. 6 is a sectional view illustrating the vehicle USB Type-C connector in a released status.

Referring to FIG. 4 and FIG. 6, the operation manner of the vehicle USB Type-C connector is illustrated. When the push plate 121 is pressed and the CPA 12 is inserted into the engagement groove 112, the upper lock plate 122 is engaged above the engagement groove 112, the lower lock plate 123 is inserted into the engagement groove 112, the resist portion 1211 resists against the protrusion plate 1122, the engagement plate 1121 is engaged into the U groove 124, the engagement hook 1221 hooks one side of the engagement plate 1121, the bevel hook 1232 hooks the slope plate 1124, the bevel protrusion 212 is engaged in the bevel groove 1123, the CPA 12 is fastened with the cable end member 1, and the cable end member 1 is fastened with the board end member 2.

When the push plate 121 is pressed, the resist portion 1211 slides to leave the protrusion plate 1122, the bevel hook 1232 rises to leave the slope plate 1124 to be engaged into the bevel groove 1123, the engagement hook 1221 rises to leave the side of the engagement plate 1121, the barb 1231 hooks one side of the engagement plate 1121, the CPA 12 is prevented from sliding outward, the CPA 12 is released from the cable end member 1, and the cable end member 1 is released from the board end member 2.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A vehicle USB Type-C connector, comprising a cable end member and a board end member; wherein the cable end member is engaged with the board end member;

the cable end member comprises a cable end plastic shell, a CPA, a PCB attached male head, a cover shell, an encapsulated outer mold, and a cable; wherein the cable end plastic shell comprises a cable end plastic shell cavity passing therethrough; the cover shell is inserted into the cable end plastic shell cavity; the cable end plastic shell has an engagement groove on a top portion thereof; the cable end plastic shell has a lateral engagement groove disposed on two sides thereof, respectively; the CPA is inserted into the engagement groove; the PCB attached male head is disposed in the cover shell; the cable has one end passing through the encapsulated outer mold and disposed in the cover shell and connected with one end of the PCB attached male head; the PCB attached male head has another end disposed out of an end of the cover shell and protruding from a cavity opening on one end of the cable end plastic shell cavity; the encapsulated outer mold is disposed on another end of the cover shell and inserted into a cavity opening on another end of the cable end plastic shell cavity; the encapsulated outer mold has an engagement side on two sides thereof, respectively; the engagement side is inserted into the corresponding lateral engagement groove;

the board end member comprises a board end plastic shell and a female seat member; the board end plastic shell comprises a board end plastic shell cavity therein; the female seat member is inserted into the board end plastic shell cavity;

the board end plastic shell comprises a bevel protrusion on a top portion thereof;

the CPA comprises a push plate, an upper lock plate, a lower lock plate, and a U groove; the upper lock plate and the lower lock plate are connected with the push plate; the upper lock plate is arranged above the lower lock plate and shorter than the lower lock plate; the U groove is formed between the upper lock plate and the lower lock plate; the upper lock plate comprises an engagement hook on one end; the lower lock plate comprises a barb; the lower lock plate comprises a bevel hook on one end; the push plate has a resist portion on a bottom portion thereof; the resist portion is applied as a force bearing point during pressing the push member;

the engagement groove comprises an engagement plate on a top portion thereof, a protrusion plate, a bevel groove, and a slope plate therein;

when the push plate is pressed such that the CPA is inserted into the engagement groove, the upper lock plate is engaged above the engagement groove, the lower lock plate is inserted into the engagement groove, the resist portion resists against the protrusion plate, the engagement plate is engaged into the U groove, the engagement hook hooks one side of the engagement plate, the bevel hook hooks the slope plate, the bevel protrusion is engaged in the bevel groove, the CPA is fastened with the cable end member, and the cable end member is fastened with the board end member.

2. The vehicle USB Type-C connector of claim 1, wherein the CPA is further configured such that, when the push plate is pressed while the CPA is fastened with the cable end member, the resist portion slides to leave the protrusion plate, the bevel hook rises to leave the slope plate to be engaged into the bevel groove, the engagement hook rises to leave the side of the engagement plate, such that the barb hooks one side of the engagement plate, such that the CPA is prevented from sliding outward, the CPA is released from the cable end member, and the cable end member is released from the board end member.

3. The vehicle USB Type-C connector of claim 1, wherein the female seat member comprises a top hook and an elastic plate on a top portion thereof; the board end plastic shell cavity comprises a top hook groove matching the top hook and an elastic plate engagement groove matching the elastic plate; the top hook hooks the top hook groove; the elastic plate is engaged into the elastic plate engagement groove.

4. The vehicle USB Type-C connector of claim 1, wherein the female seat member comprises a weld leg; the weld leg comprises at least two types of weld legs, including SMT weld legs and DIP weld legs.

5. The vehicle USB Type-C connector of claim 4, wherein the weld legs are configured in a sink plate design.

6. The vehicle USB Type-C connector of claim 1, wherein the cover shell comprises an upper cover shell and a lower cover shell; the upper and lower cover shells are stably engaged together.

7. A vehicle USB Type-C cable connector comprising:
a plastic shell comprising a cavity and an engagement groove on a top portion thereof;
a cover shell at least partially disposed in the cavity of the plastic shell;
a male head at least partially disposed in the cover shell;
a cable comprising an end coupled to the male head; and
a connector position assurance (CPA) at movably disposed, at least in part, in the engagement groove, the CPA comprising a lower portion comprising a bevel hook and a barb, and an upper portion shorter than the lower portion and comprising an engagement hook, wherein:
the CPA is movable between an engaged position and a released position;
the engagement groove of the plastic shell comprises a top portion, a protrusion, and a sloped protrusion; and
when the CPA is in the released position:
the engagement hook of the upper portion of the CPA is disengaged from the top portion of the engagement groove,
the bevel hook of the lower portion of the CPA is disengaged from the sloped protrusion of the engagement groove, and
the barb of the lower portion is hooked to the top portion of the engagement groove.

8. The vehicle USB Type-C cable connector of claim 7, wherein:
the CPA comprises a groove between the upper portion and the lower portion; and
when the CPA is in a fastened state, the top portion of the engagement groove engages the groove of the CPA, the engagement hook of the upper portion of the CPA hooks the top portion of the engagement groove, and the bevel hook of the lower portion of the CPA hooks the sloped protrusion of the engagement groove.

9. The vehicle USB Type-C cable connector of claim 7, wherein:
the male head comprises a printed circuit board (PCB); and
the male head comprises one end coupled to the cable and another end disposed out of an end of the cover shell.

10. The vehicle USB Type-C cable connector of claim 7, comprising:
an encapsulated outer mold, wherein:
the end of the cable passes through the encapsulated outer mold.

11. The vehicle USB Type-C cable connector of claim 10, wherein:
the plastic shell comprises lateral engagement grooves disposed on two sides; and
the encapsulated outer mold comprises engagement sides inserted into respective lateral engagement grooves of the plastic shell.

12. The vehicle USB Type-C cable connector of claim 10, wherein:
the encapsulated outer mold is inserted into an opening of the cavity of the plastic shell.

13. A system comprising:
the vehicle USB Type-C cable connector of claim 7; and
a vehicle USB Type-C board connector comprising a plastic shell having a bevel protrusion on a top portion therefore, wherein:
the engagement groove of the plastic shell of the vehicle USB Type-C cable connector comprises a bevel groove; and
when the CPA is in the fastened state, the bevel protrusion of the plastic shell of the vehicle USB Type-C board connector engages the bevel groove of the engagement groove of the plastic shell of the vehicle USB Type-C cable connector.

14. A vehicle USB Type-C board connector comprising:
a plastic shell comprising a cavity, the cavity comprising a hook groove and an engagement groove; and
a seat member at least partially disposed in the cavity of the plastic shell, the seat member comprising
a top hook engaging the hook groove of the cavity of the plastic shell,
an elastic plate engaging the engagement groove, and
a plurality of weld legs, the plurality of weld legs comprising at least two types of weld legs, the at least two types of weld legs comprising surface mount weld legs and pin in paste weld legs,
wherein the plurality of weld legs are configured in a sink plate design so as to reduce a height of the vehicle USB Type-C board connector.

15. The vehicle USB Type-C board connector of claim 14, wherein:
the plurality of weld legs are disposed in two rows.

16. The vehicle USB Type-C board connector of claim 14, wherein:
the plastic shell comprises a bevel protrusion on a top portion thereof.

17. A system comprising:
the vehicle USB Type-C board connector of claim 16; and
a vehicle USB Type-C cable connector comprising:
a plastic shell comprising a cavity and an engagement groove on a top portion thereof, the engagement groove comprising a bevel groove,
a cover shell at least partially disposed in the cavity of the plastic shell,
a male head at least partially disposed in the cover shell, and
a cable comprising an end coupled to the male head,
wherein the bevel protrusion of the plastic shell of the vehicle USB Type-C board connector engages the bevel groove of the engagement groove of the plastic shell of the vehicle USB Type-C cable connector.

18. The system of claim 17, wherein:
the vehicle USB Type-C cable connector comprises a connector position assurance (CPA) at least partially disposed in the engagement groove of the plastic shell of the vehicle USB Type-C cable connector, the CPA comprising a lower portion comprising a bevel hook, and an upper portion shorter than the lower portion and comprising an engagement hook, wherein:
the engagement groove of the plastic shell of the vehicle USB Type-C cable connector comprises a top portion, a protrusion, and a sloped protrusion; and
when the CPA is in a fastened state, the top portion of the engagement groove engages the groove of the CPA, the engagement hook of the upper portion of the CPA hooks the top portion of the engagement groove, and the bevel hook of the lower portion of the CPA hooks the sloped protrusion of the engagement groove.

19. The system of claim 18, wherein:
the lower portion of the CPA comprises a barb; and
when the CPA is in a released state, the engagement hook of the upper portion of the CPA disengages the top portion of the engagement groove, the bevel hook of the lower portion of the CPA disengages the sloped protrusion of the engagement groove, and the barb of the lower portion hooks the top portion of the engagement groove.

20. The system of claim 18, wherein:
the CPA comprises a push plate connecting the upper portion and the lower portion.

* * * * *